United States Patent
Karstens et al.

(10) Patent No.: US 11,119,229 B2
(45) Date of Patent: Sep. 14, 2021

(54) IOT ENABLED DEVICE FILTER

(71) Applicant: INTERNATIONAL BUSINESS MACHINES CORPORATION, Armonk, NY (US)

(72) Inventors: Christopher Karstens, Miami Beach, FL (US); Rhonda L. Childress, Austin, TX (US); Stan Kevin Daley, Atlanta, GA (US); Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 16/202,490

(22) Filed: Nov. 28, 2018

(65) Prior Publication Data

US 2020/0166660 A1 May 28, 2020

(51) Int. Cl.
| | |
|---|---|
| *G01V 1/00* | (2006.01) |
| *A01M 1/22* | (2006.01) |
| *A01M 1/04* | (2006.01) |
| *A01M 29/18* | (2011.01) |
| *G08B 21/18* | (2006.01) |
| *G08B 5/36* | (2006.01) |
| *G09G 5/02* | (2006.01) |
| *G10L 15/18* | (2013.01) |

(52) U.S. Cl.
CPC .............. *G01V 1/001* (2013.01); *A01M 1/04* (2013.01); *A01M 1/223* (2013.01); *A01M 29/18* (2013.01); *G08B 5/36* (2013.01); *G08B 21/18* (2013.01); *G09G 5/026* (2013.01); *G09G 2320/0666* (2013.01); *G10L 15/18* (2013.01)

(58) Field of Classification Search
CPC ......... G01V 1/001; A01M 1/04; A01M 1/223; A01M 29/18; G08B 5/36; G08B 21/18
USPC ....................................................... 340/573.2
See application file for complete search history.

(56) References Cited

U.S. PATENT DOCUMENTS

| | | | | |
|---|---|---|---|---|
| 2008/0204253 | A1* | 8/2008 | Cottee | A01M 23/30 340/573.2 |
| 2013/0298063 | A1* | 11/2013 | Joy | A61M 5/172 715/771 |
| 2015/0272105 | A1* | 10/2015 | Peterson | G01N 33/0031 701/50 |
| 2015/0325094 | A1* | 11/2015 | Cheng | G06Q 10/00 340/601 |
| 2016/0057989 | A1* | 3/2016 | Vilinskis | A01M 1/026 340/539.13 |

(Continued)

FOREIGN PATENT DOCUMENTS

| | | |
|---|---|---|
| CN | 102334471 A | 2/2012 |
| CN | 105638638 A | 6/2016 |

OTHER PUBLICATIONS

Peter Mell et al, The NIST Definition of Cloud Computing, National Institute of Standards and Technology, Publication 800-145, 2011, entire document.

(Continued)

*Primary Examiner* — Kerri L McNally
(74) *Attorney, Agent, or Firm* — Donald G. Weiss

(57) ABSTRACT

Aspects of the present invention determine a presence of insects at a location of a first device that comprises a computer processor, and in response to determining the presence of the insects at the location of the first device, apply a screen overlay that changes colors displayed by a display of the first device.

17 Claims, 5 Drawing Sheets

(56) References Cited

U.S. PATENT DOCUMENTS

2017/0367314 A1    12/2017  Billingsley, Jr.
2018/0146612 A1*    5/2018  Sauder ............. G06Q 10/06395
2018/0366230 A1*   12/2018  Pulitzer ................. G16H 80/00

OTHER PUBLICATIONS

David Pogue, 8 Recognition Apps Work Almost Like Magic, Scientific American, 2013, entire document.
Emily Price, Cicada Hunt Is Like Shazam for Insect Sounds, Mashable, 2013, entire document.

* cited by examiner

IOT ENABLED DEVICE FILTER

TECHNICAL FIELD

The present invention relates generally to a method, system, and computer program product for a networked, programmable device. More particularly, the present invention relates to a method, system, and computer program product for programmable pest control devices.

BACKGROUND

The term "Internet of Things" (IoT) refers to a network of devices, such as physical devices, vehicles, home appliances, and other items embedded with electronics, software, sensors, actuators, and connectivity that enable the devices to connect, collect and exchange data. An example of the IoT devices is a smartphone, which connects communicatively to other devices and displays information on a display device. The display device typically uses a broad spectrum of light that includes red, green, and blue (RGB) colors to visually display information to a user. Conventionally, the display in response to changes in surrounding detected light, detected will automatically brighten or darken in intensity, which allow the information to be more readable by a user. For example, in bright sun, the intensity of colors can be increased, and in darkness, the intensity of colors can be decreased.

Some IoT devices provide nighttime filters, which provide overlays to the display according to predetermined time of day or in response to an input by the user. For example, blue backgrounds are changed to yellow backgrounds according to a time each day that represents a period of sleep for the user. The period of sleep is often entered into the IoT device by the user in a profile setting. The absence of the blue backgrounds or the presence of yellow backgrounds can be less stimulating and more conducive to sleep. The IoT devices use an overlay or mapping, which map the broad spectrum of the displayed light to a band of yellow light.

The field of pest control includes insect control, for example, devices that repel, or attract and contain or incapacitate, insects. Local insect control and associated disease prevention conventionally includes bug traps and bug repellant devices. The bug traps, such as bug zappers use a broad spectrum light source or other source that attract insects and a killing device, such as an electric grid near the source to kill the attracted insects. The bug repellant devices can emit broadcasted ultrasonic sonic sound waves, which are inaudible or not objectionable to humans, to repel the insects in a localized area.

BRIEF SUMMARY

In one aspect of the present invention, a computer-implemented method for local insect control includes executing a computer processor determining a presence of insects at a location of a first device, wherein the first device comprises the computer processor, and in response to determining the presence of the insects at the location of the first device, applying a screen overlay that changes colors displayed by a display of the first device.

In another aspect, a system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby controls local insects, which determines a presence of insects at a location of a first device, wherein the first device comprises the computer processor, and in response to determining the presence of the insects at the location of the first device, applies a screen overlay that changes colors displayed by a display of the first device.

In another aspect, a computer program product for local insect control has a computer-readable storage medium with computer readable program code embodied therewith. The computer readable program code includes instructions for execution by a computer processor that cause the computer processor to determine a presence of insects at a location of a first device, wherein the first device comprises the computer processor, and in response to determining the presence of the insects at the location of the first device, apply a screen overlay that changes colors displayed by a display of the first device.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
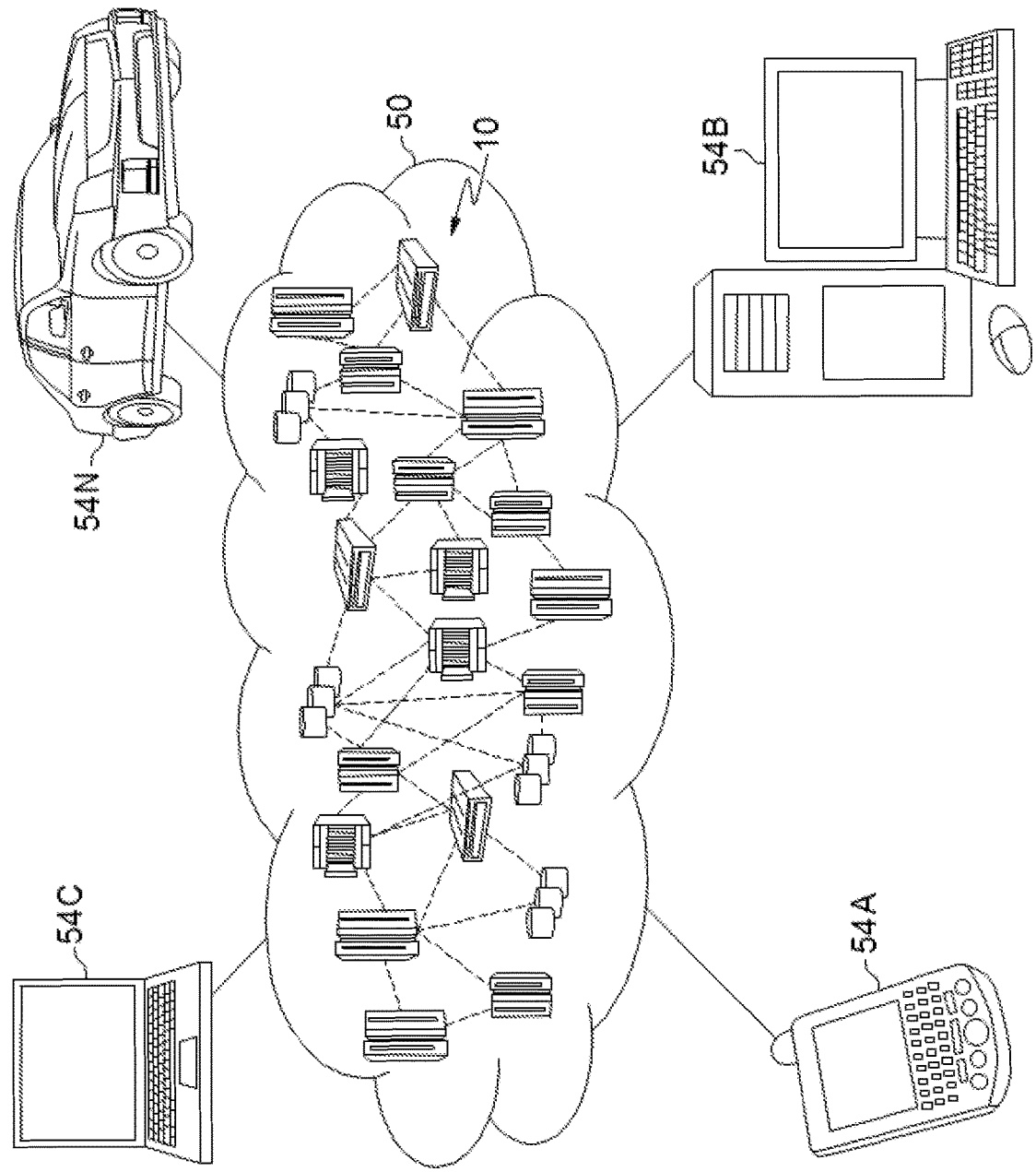
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
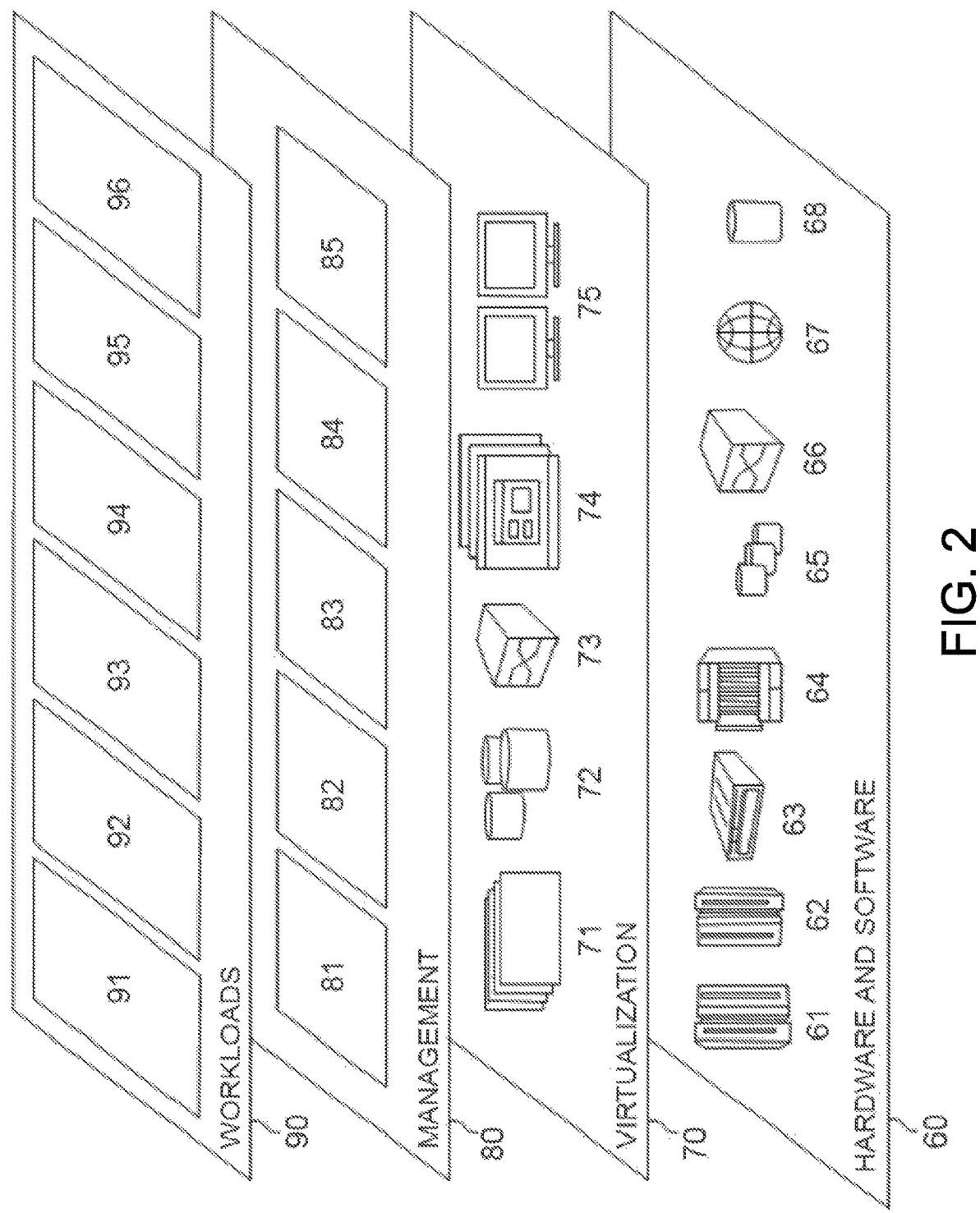
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for local insect control 96.

Figure 3:
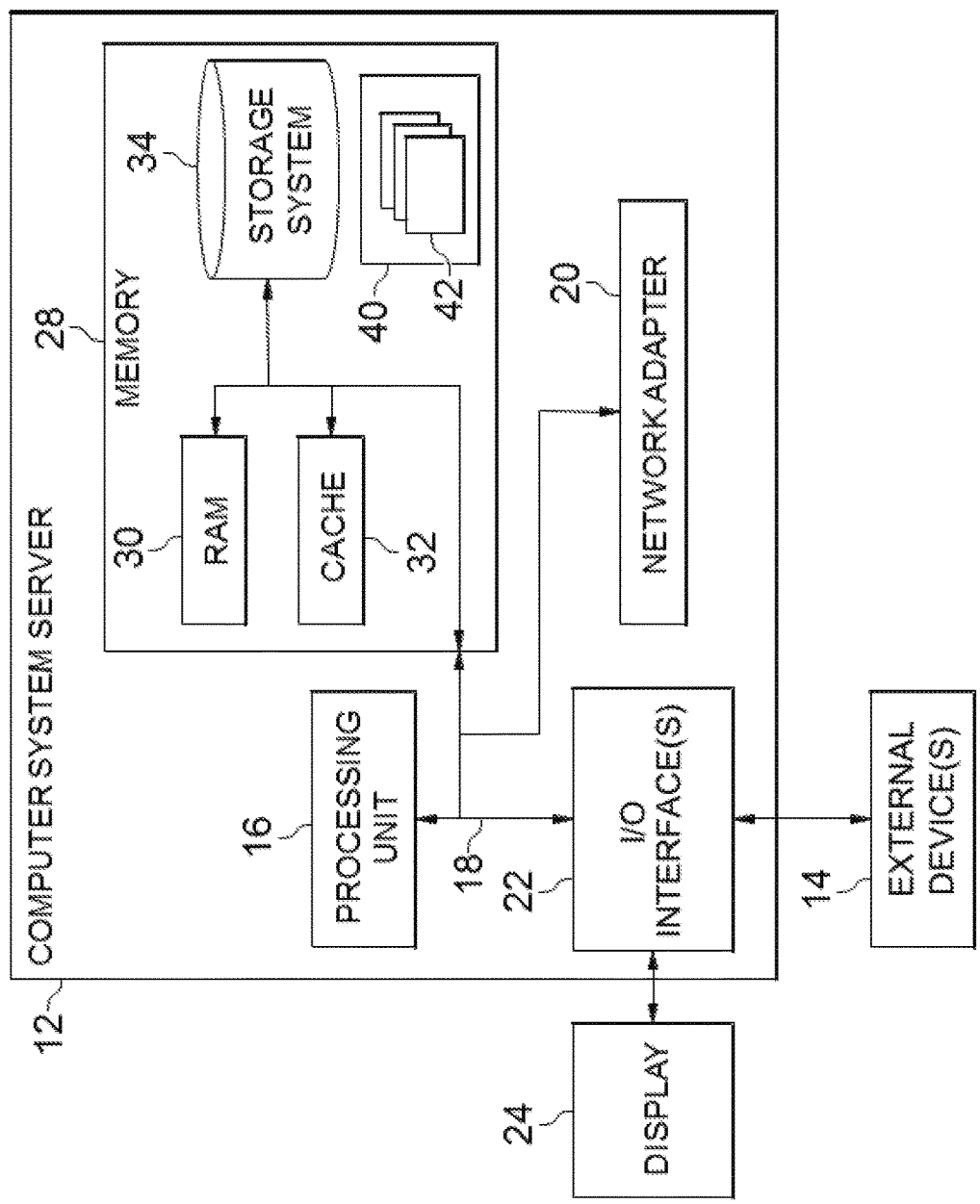
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
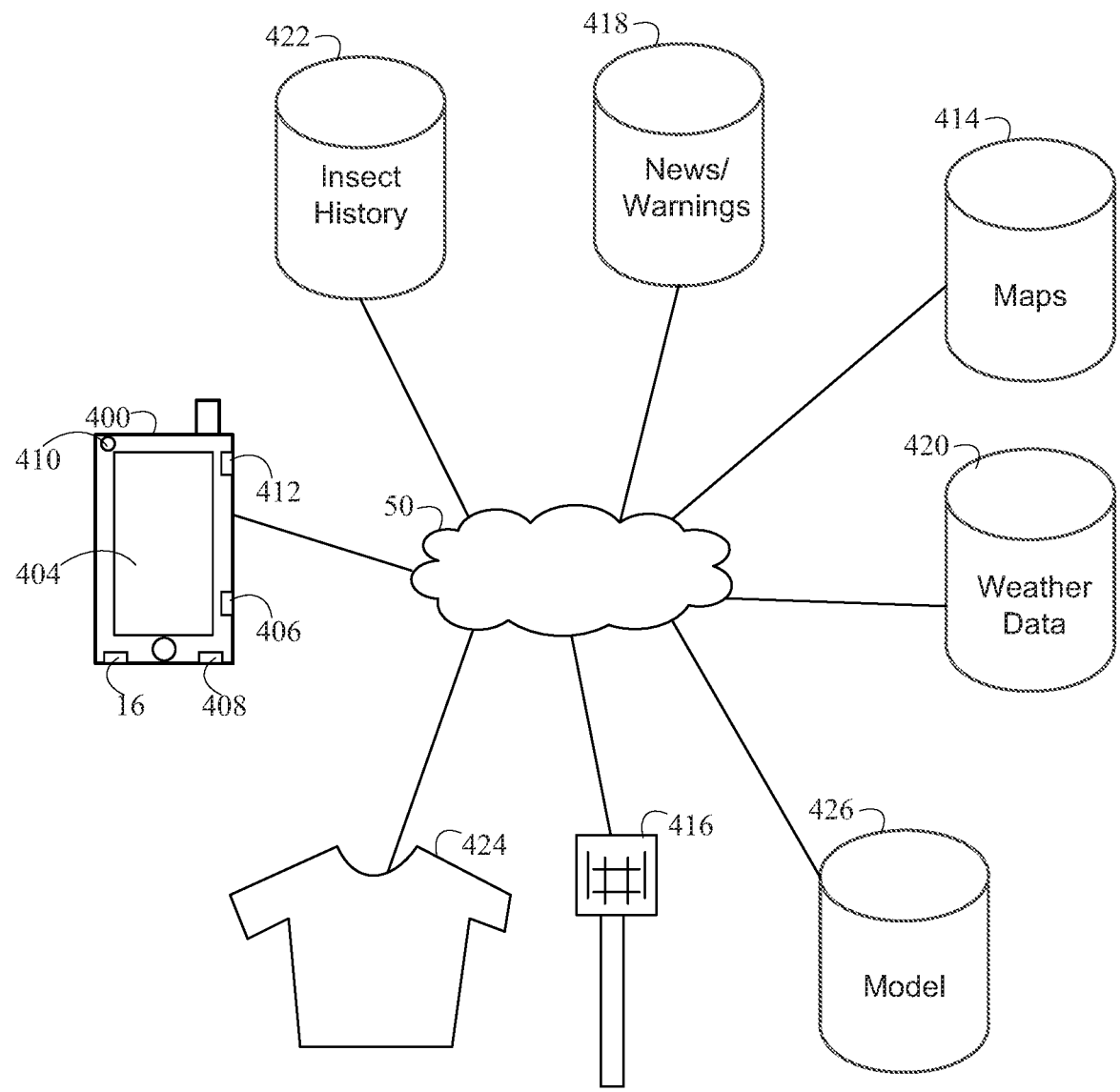
FIG. 4 depicts an example schematic illustration of an embodiment of the present invention.

FIG. 4 schematically illustrates an example according to the present invention for local insect control. A first device 400, such as the computing device 54, smartphone, and the like includes a configured processor, such as the processing unit 16 as described in reference to FIG. 3. The first device includes a display 404, and a global positioning system (GPS) unit 406. The first device can include an audio input device 408, such as a microphone, a video input device 410, such as a camera, a motion detecting device 412, such as an accelerometer, and combinations thereof.

The configured processor determines a presence of insects at a location of the first device 400. The presence of insects can be determined from input and analysis of data indicative of the presence of insects, such as mosquitos, black flies, scorpions, black widow spiders, ticks, brown recluse spiders, etc. The data can include direct measures of the insects, indirect measures of the insects, conditions or risk factors conducive to active populations of the insects, and combinations thereof. In some embodiments, the determined presence of insects at a location can be limited to specific insect populations. In some embodiments, the determined presence of insects at a location can be limited to types of insects carrying human disease vectors. For example, the detected presence can be limited to Aedes mosquito populations, which carry the Zika virus. In another example, the detected presence can be limited to ticks which carry Lyme's disease.

The location of the first device can be determined from the GPS unit 406. The location can include geographic coordinates, a geospatial location corresponding to a geographic map 414. The map 414 can include buildings, altitudes or contours, roads, geopolitical boundaries, geographic features, such as rivers, standing waters, etc. The location can include a predetermined distance based on a physical distance, such as a radius around the first device 400, or a physical distance determined according to geopolitical regions, such as a city block incorporating the first device, etc. The location can include the predetermined distance based on a communication distance, such as BLUETOOTH®, Wi-fi, near field communication, etc. BLUETOOTH is a registered trademark of BLUETOOTH SIG, INC. in the United States or in other countries. Combinations of the above are contemplated.

The configured processor, in response to determining the presence of the insects at the location of the first device, applies a screen overlay or filter. The overlay changes the colors displayed by the display 404 of the first device 400. For example, the overlay maps the broad spectrum of light, such as red, green, and blue (RGB) of the display to a band of yellow light or yellow background light. The overlay can include an indicator of a probability of insect presence, such as a bar which increases in length as the probability increases, a circle which increases in diameter as the probability increases, a numerical representation, a number of bars, and the like.

The configured processor can, in further response to determining the presence of the insects at the location of the first device 400, identify a second device 416 communicatively connected to the first device 400 and within a predetermined distance to the computing device. The configured processor sends a signal to the second device 416 to change operation which reduces the presence of the insects at the location. For example, the second 416, such as a bug zapper located with BLUETOOTH signal distance receives a signal to turn on a light source, which attracts bugs to the light source and kills the insects with an electrical grid. In another example, a signal is sent to a bug repellant device connected by Wi-Fi to begin to emit ultrasonic sound, which repels the insects.

Direct measurements can include sounds received from the audio input device 408, which are matched for sounds of corresponding insects. For example, the beat of some mosquito wings emit a sound at 17.4 kHz. Direct measurements can include insects identified in images received from the video input device 410 using visual pattern matching.

Indirect measurements can include statements of a user received by the audio input device 408 and analyzed using natural language processing (NLP) techniques. For example, the statement "the mosquitos are out tonight" received by a microphone of a smartphone is indicative of the presence of insects. Indirect measurements can include motions indicative of responses to the presence of insects measured by the video input device 410, the motion detecting device 412, and combinations thereof. For example, a flying insect lands of the display 404, and in response the user abruptly shakes the display, or the user swats the display with a hand, which abruptly moves the display. The motion can be identified by the abrupt changes in the image, presence of the hand in the image, or the direct movement of the first device 400. Indirect measures can include measures of predators of the insects, such as bats.

Risks or conditions can include measurements of conditions conducive to active presence of insects, such as light, moisture, temperature, wind, time of day and combinations thereof measured by local sensors or received from sources, such as electronic news sources 418, weather data 420, insect history 422, and combinations thereof.

For example, mosquito activity increases at dusk, which can be determined as a function of a difference between a current time and sun set at the location. Mosquito activity increases in areas with low wind, high humidity, standing water, and warmer temperatures. The conditions for mosquito activity can be received from the electronic news sources 418, such as news reports of warnings for disease conditions, such as Zika or encephalitis. The conditions for mosquito activity can be received from the weather data 420 indicative of current and past weather, such as current temperature, current precipitation, current humidity, current wind speed, previous precipitation, previous temperatures indicative of breeding conditions, standing water, etc. The conditions for mosquito activity can include the insect history 422 for the location and/or larger geographic areas according to the maps 414. The maps 414 can include geographic placement of measures of insect populations, standing water, etc.

The conditions can be received from a third device 424, such as body worn sensor. For example, the body worn sensor is clothing with sensor embedded within the clothing. For example, a shirt with sensors provides moisture estimates indicative of perspiration that can attract mosquitos. The shirts can include sensors, which measure an inside temperature of body temperature and/or an outside temperature or ambient temperature. The first device 400 receives a signal from the third device 424 of the sensed measurements and the third device 424 communicatively connected to the first device 400 and located within a predetermined distance determined physically or communicatively.

In some embodiments, the configured processor determines the location of the first device 400 as located outside a protective enclosure. For example, protective structures, such as enclosed buildings can be determined from the location and the maps 414. Other sources, such as temperature sensors can compare the ambient temperature of the location with a local temperature. For example, a user holding the device is standing outside a protective enclosure where the temperature of the local sensor corresponds to the weather reported temperature. The user enters an air conditioned space where the temperature of the local sensor deviates from the weather reported temperature.

The configured processor uses a model 426, such as a deep learning model, support vector machines, Bayesian networks, neural networks, linear regression models, long short term memory (LSTM), and the like, to input the received measurements: direct, indirect, conditions, and combinations thereof; analyze the received measurements; and output a probability of the presence of the insects at the location of the first device 400. In some embodiments, the output can be a weighted sum, which is related to a predetermined threshold to determine the presence of the insects at the location of the first device 400. In some embodiments, the inputs and analysis include the determination of being outside a protective enclosure.

The present invention provides improvements over conventional local insect control. For example, conventional local insect control uses devices that attract and kill insects, and devices that repel insects. Displays of local computing devices 54 do not consider the presence of insects and do not change in response to the presence of insects.

Figure 5:
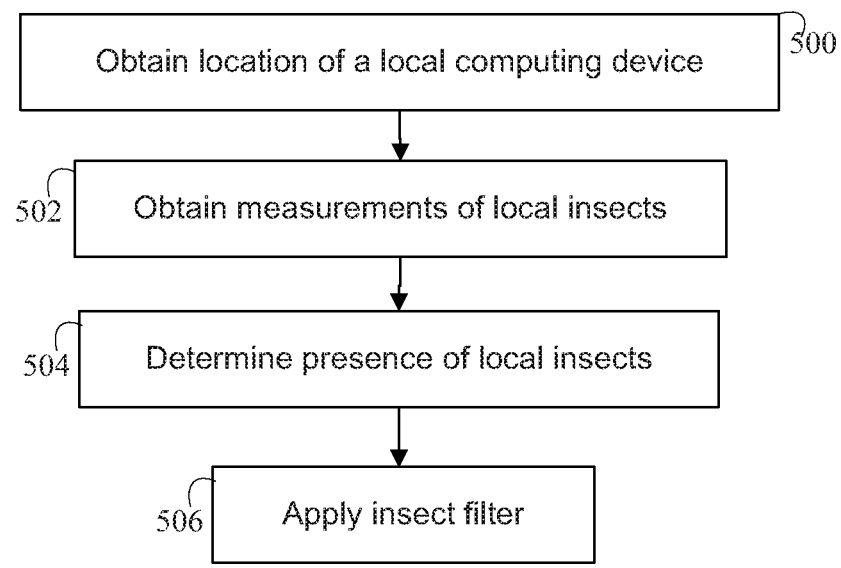
FIG. 5 is a flow chart illustration of an embodiment of the present invention.

FIG. 5 illustrates one embodiment of a method of the present invention for local insect control. At 500, the configured processor obtains a position of the first device 400, such as the computing device 54, smartphone, tablet, laptop, and the like.

At 502, the configured processor obtains measurements of the local insects. The measurements include direct measurements, indirect measurement, conditions for local insects, and combinations thereof. The local insects can include a single species of insects or a plurality of species of insects. The local insects can include types of insects based on disease vectors.

At 504, the configured processor determines the presence of the local insects at the location. The determined presence of the local insects can include a probabilistic value. In some embodiments, the determined presence can include the measurements used. For example, the measurements can be ranked ordered and displayed as an ordered list.

At 506, in response to the determined presence of the insects at the location, the configured processor applies an overlay to the display 404 of the first device 400. The overlay acts as a filter to change the colors of light displayed by the display 404. The filter can change the colors to a yellow band. In some embodiments, the applied overlay includes the indicator, the list of measurements contributing to the determined presence of insects at the location and combinations thereof.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining a presence of insects at a location of a first device, wherein the first device comprises a computer processor;
in response to determining the presence of the insects at the location of the first device, determining if the location of the first device is located outside a protective enclosure; and
in response to determining the location of the first device is located outside the protective enclosure, applying a screen overlay that changes colors displayed by a display of the first device.

2. The method of claim 1, further including:
in response to determining the presence of the insects at the location of the first device, identifying a second device communicatively connected to the first device and within a predetermined distance to the first device; and
sending a signal to the second device to change operation which reduces the presence of the insects at the location.

3. The method of claim 1, further comprising:
receiving audio input from an audio input device, wherein the first device comprises the audio input device; and
identifying statements indicative of the presence of the insects using natural language processing from the received audio input.

4. The method of claim 1, further comprising:
receiving a signal from a third device indicative of a condition for the presence of the insects and the third device communicatively connected to the first device and located within a predetermined distance to the first device, wherein the third device comprises a body worn sensor; and
wherein determining the presence of insects at the location of the first device comprises analyzing the signal received from the third device.

5. The method of claim 1, wherein determining the presence of the insects at the location of the first device comprises analyzing conditions, wherein analyzing conditions include measures of insect activity selected from a group consisting of:
a function of a difference between a current time and sun set at the location;
a measure of humidity at the location;
a measure of precipitation at the location;
a measure of temperature at the location;
a geographic map with measures of an insect population;
a news report indicative of presence of insects for the location; and
a measure of standing water for the location.

6. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the determining the presence of insects at the location of the first device, and in response to determining the presence of the insects at the location of the first device, applying the screen overlay to the display of the first device.

7. The method of claim 6, wherein the computer-readable program code is provided as a service in a cloud environment.

8. A system, comprising:
a computer processor;
a computer readable memory in circuit communication with the computer processor; and
a computer readable storage medium in circuit communication with the computer processor;
wherein the computer processor executes program instructions stored on the computer readable storage medium via the computer readable memory and thereby:
determines a presence of insects at a location of a first device, wherein the first device comprises the computer processor;
in response to determining the presence of the insects at the location of the first device, determines if the location of the first device is located outside a protective enclosure; and
in response to determining the location of the first device is located outside the protective enclosure, applies a screen overlay that changes colors displayed by a display of the first device.

9. The system of claim 8, wherein the processor executes program instructions stored on the computer readable storage medium via the computer readable memory and thereby:
in response to determining the presence of the insects at the location of the first device, identifies a second device communicatively connected to the first device and within a predetermined distance to the first device; and
sends a signal to the second device to change operation which reduces the presence of the insects at the location.

10. The system of claim 8, in the processor executes program instructions stored on the computer readable storage medium via the computer readable memory and thereby:
receives audio input from an audio input device, wherein the first device comprises the audio input device; and
identifies statements indicative of the presence of the insects using natural language processing from the received audio input.

11. The system of claim 8, wherein the processor executes program instructions stored on the computer readable storage medium via the computer readable memory and thereby:
receives a signal from a third device indicative of a condition for the presence of the insects and the third device communicatively connected to the first device and located within a predetermined distance to the first device, wherein the third device comprises a body worn sensor; and
analyzes the signal received from the third device.

12. The system of claim 8, wherein the processor executes program instructions stored on the computer readable storage medium via the computer readable memory and thereby:
analyzes conditions that include measures of insect activity selected from a group consisting of:
a function of a difference between a current time and sun set at the location;
a measure of humidity at the location;
a measure of precipitation at the location;
a measure of temperature at the location;
a geographic map with measures of an insect population;
a news report indicative of presence of insects for the location; and
a measure of standing water for the location.

13. A computer program product, comprising:
a computer readable storage medium having computer readable program code embodied therewith, the computer readable program code comprising instructions for execution by a computer processor that causes the computer processor to:
determine a presence of insects at a location of a first device, wherein the first device comprises the computer processor;
in response to determining the presence of the insects at the location of the first device, determines if the location of the first device is located outside a protective enclosure; and
in response to determining the location of the first device is located outside the protective enclosure, apply a screen overlay that changes colors displayed by a display of the first device.

14. The computer program product of claim 13, wherein the instructions for execution cause the computer processor to:
in response to determining the presence of the insects at the location of the first device, identify a second device communicatively connected to the first device and within a predetermined distance to the first device; and
send a signal to the second device to change operation which reduces the presence of the insects at the location.

15. The computer program product of claim 13, wherein the instructions for execution cause the computer processor to:
receive audio input from an audio input device, wherein the first device comprises the audio input device; and
identify statements indicative of the presence of the insects using natural language processing from the received audio input.

16. The computer program product of claim 13, wherein the instructions for execution cause the computer processor to:
receive a signal from a third device indicative of a condition for the presence of the insects and the third device communicatively connected to the first device and located within a predetermined distance to the first device, wherein the third device comprises a body worn sensor; and
analyze the signal received from the third device.

17. The computer program product of claim 13, wherein the instructions for execution cause the computer processor to:
analyze conditions that include measures of insect activity selected from a group consisting of:
a function of a difference between a current time and sun set at the location;
a measure of humidity at the location;
a measure of precipitation at the location;
a measure of temperature at the location;
a geographic map with measures of an insect population;
a news report indicative of presence of insects for the location; and
a measure of standing water for the location.

* * * * *